Nov. 4, 1952 W. B. SMITH 2,616,237
MOISTENER FOR COTTON-PICKING SPINDLES
Filed June 13, 1949 2 SHEETS—SHEET 1

INVENTOR.
William Burris Smith
BY
Lee B. Kenon
ATTORNEY.

Nov. 4, 1952 — W. B. SMITH — 2,616,237
MOISTENER FOR COTTON-PICKING SPINDLES
Filed June 13, 1949 — 2 SHEETS—SHEET 2

Inventor
William Burris Smith
By Lee B. Kemon
ATTORNEY.

Patented Nov. 4, 1952

2,616,237

UNITED STATES PATENT OFFICE 2,616,237

MOISTENER FOR COTTON-PICKING SPINDLES

William B. Smith, Greenville, Miss., assignor of one-half to Hugh A. Gamble, Greenville, Miss.

Application June 13, 1949, Serial No. 98,838

6 Claims. (Cl. 56—47)

This invention relates to improvements in cotton harvesters, and more particularly to a novel construction for moistening the spindles in a rotary spindle type cotton picker.

The rotary spindle type cotton picker as shown, for example, in Patent 1,747,566 issued to Hiram N. Berry, February 18, 1930, comprises a plurality of rotary picking spindles supported by and projecting from a rotary drum or cylinder. The drum is rotated on a vertical axis and moved along the side of a row of cotton plants while the rotary picking spindles are successively projected into the plants to wind off the cotton. The picked cotton on the spindles is subsequently removed therefrom by stripper bars guided by cam tracks.

It is found that cotton fibers are more efficiently picked by and removed from the rotary spindles if the spindles are moistened before being projected into the cotton plants.

It is an object of this invention to provide an improved construction for moistening rotary cotton picking spindles.

It is another object of this invention to provide a construction for simultaneously moistening each spindle in a vertical row of picking spindles.

It is another object of this invention to provide a construction for moistening the picking spindles with an ascending fog-type spray.

It is still another object of this invention to provide moisteners operative to moisten the picking spindles immediately prior to the entry of the spindles into the cotton plants, and to mount such moisteners so that they will not be damaged if engaged by a stalk or branch of the cotton plants or by a picking spindle.

Other objects and advantages of this invention will be readily apparent to those skilled in the art from examination of the following description of the preferred construction illustrated in the accompanying drawings wherein.

Figure 1:
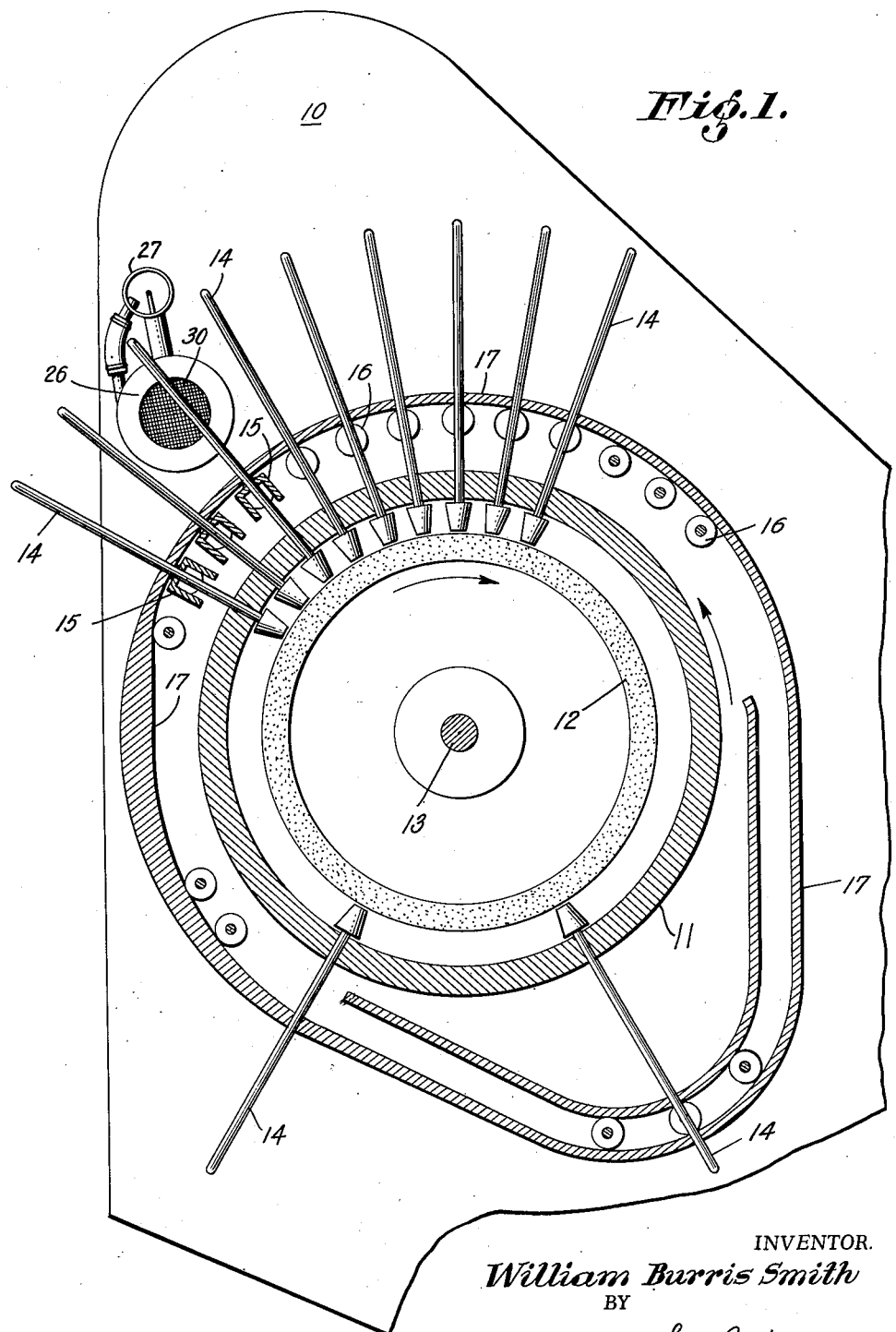
Figure 1 is a horizontal sectional view, partly diagrammatic, of a rotary spindle cotton picking unit illustrating the normal position of a spindle moistener.

Referring to Figure 1, the horizontal base plate of a cotton picking unit is indicated by the numeral 10. A spindle supporting drum or cylinder 11 is journaled for counter-clockwise rotation on a vertical axis, and spindle driving discs 12 are supported by a vertical shaft 13 driven in a clockwise direction. Cotton picking spindles 14 are supported in conventional bearings, not shown, in the drum 11, and project radially outward therefrom. The spindles 14 are arranged in vertical rows, and each vertical row is provided with a stripper bar 15 having a roller 16 at its lower end engaging the cam track 17 secured to the base plate 10. A satisfactory arrangement of spindle drive and cam track constructions is shown in the copending application Serial Number 787,052, filed November 27, 1947, by Hugh A. Gamble, and now Patent No. 2,540,046, dated January 30, 1951.

Figures 2, 3:
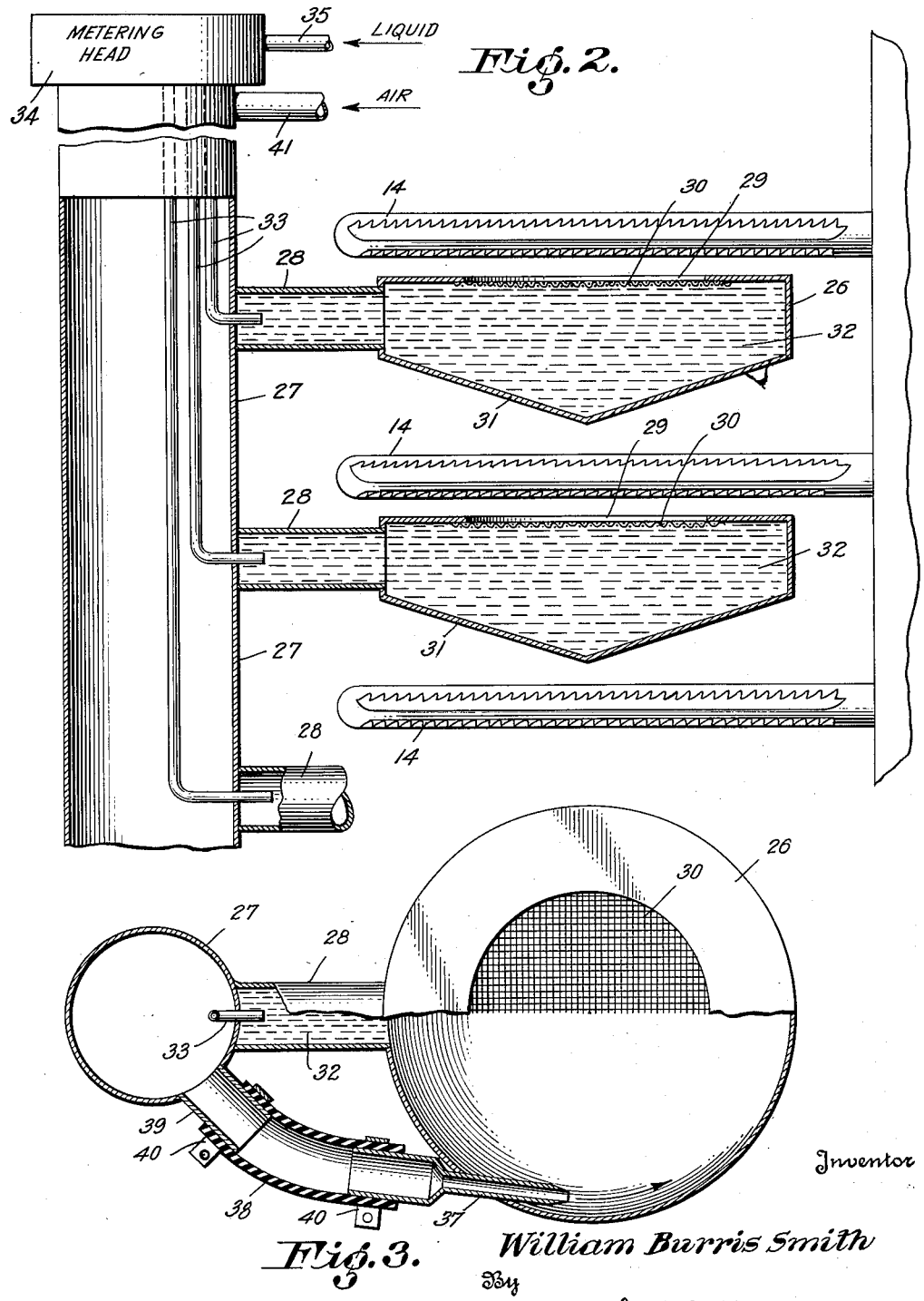
Figure 2 is a vertical sectional view, partly diagrammatic, illustrating the normal position of the spindle moisteners with respect to a portion of a vertical row of spindles.
Figure 3 is a plan view, partly in section, of one of the spindle moisteners shown in Figure 2.

The preferred form of spindle moistener embodying my invention is shown in Figure 2. A vertical column of moistener devices 26 are supported for limited rotation on a vertical axis so that foam generators project between the picking spindles 14 of each vertical row of spindles in advance of the point at which said row of spindles penetrates into the cotton plants for winding off cotton fibers. A foam generator 26 is normally positioned below each picking spindle 14 of a vertical row of spindles. Each moistener unit is mounted on a supporting tube or sleeve 27 by a laterally projecting tube 28 supporting the foam generator 26. The tube 27, tube 28, and generator 26 may be formed of sheet metal, and the tube 28 may be welded or soldered to the tube 27 and to the generator 26. The generator container 26 has a top opening 29 smaller in diameter than the diameter of the generator and covered by a wire mesh screen 30, and preferably has a dished or conical bottom 31. The liquid 32 is supplied to each generator container 26 through a relatively small bore tube 33 which leads downward from a metering head 34 through the tube 27 and into the tube 28. The metering head 34 at the top of a column of generators 26 may be of any conventional construction to deliver measured quantities of moistening liquid from an inlet 35 to each of the several delivery tubes 33. The moistening liquid 32 may be a suitable mixture of water and a soapy organic chemical, such as a sodium sulfonate of an organic ester. Each generator 26 is provided with an air inlet 37 in the form of a nozzle projecting inwardly through the outer periphery of the generator in a tangential direction. The nozzle 37 is connected by tubing 38 to a duct or sleeve 39 secured to and in communication with the tube 27. The tubing 38 may be a short length of rubber hose secured to the sleeve 39 and the air nozzle 37 by clamps 40. Air under suitable pressure may be supplied to the tube 27 by an air inlet 41. The air pressure may be of the order of only a few pounds per square inch above atmospheric pressure and sufficient to agitate the moistening liquid 32 in the generator 26 to produce a rising foam through opening 29.

The generator supporting tube 27 may be one continuous sleeve or tube extending the entire vertical length of the column of generators and journaled in a conventional bearing secured to the base plate 10 to permit limited rotary movement of the tube. In such construction, the generators 26 are resiliently held in the normal position indicated in Figure 1, but may be temporarily deflected in a clockwise direction enough to permit any spindle 14 or foreign matter carried by a spindle to pass by the column of generators 26. If desired, each generator may be individually supported on a sleeve or resilient tube which will permit individual generators to be temporarily deflected out of the normal position when engaged by a spindle or foreign matter.

The operation of the spindle moisteners will now be described. The generators 26 are substantially filled with a water solution of the desired moistening liquid which is supplied to the metering head 34 through inlet 35 leading from a suitable supply reservoir. The metering head 34 feeds measured quantities of the moistening liquid to the individual tubes 33 which conduct the liquid to the individual generators 26. The metering head 34 provides that each generator 26 receives the same amount of liquid regardless of the position of the generator in the vertical column of generators. Air under pressure supplied through the connection 41 to the tube 27 passes through each sleeve 39 to each nozzle 37. Low pressure air entering each generator 26 from its air nozzle 37 agitates the moistener liquid 32 in the generator causing a foam to rise through the screen 30 in the open top 29 of each generator to moisten the spindle 14 above each generator. The screens 30 prevent foreign matter from falling into the generators 26. Any moistening liquid which happens to collect on the outside of a generator 26 will eventually collect at the center or downward apex of the conical bottom 31 and drip downward into the next lower generator for reuse. If a deflected spindle 14 or foreign matter carried thereby should strike the side of a generator 26, the mounting of the generators is such as to allow the generator or generators to be deflected enough to permit the obstruction to pass and the generator or generators to then return to the normal position for moistening the next vertical row of spindles 14 which pass between the generators. The ascending foam produced by generators of the character described has been found particularly effective for properly moistening cotton picking spindles to assure the efficient harvesting of cotton by mechanical pickers.

This invention contemplates the use of various modifications of the structure and materials disclosed herein, as it will be readily apparent that numerous variations are possible within the scope of the following claims.

I claim:

1. A device for moistening a rotary cotton-picking spindle, comprising in combination, a container for moistening liquid, a support for said container positioning said container below said spindle, said container having an opening in the top thereof, a conduit connected to said container for supplying moistening liquid to said container, and a second conduit connected to said container for supplying air under pressure to the liquid in said container to agitate said liquid and generate a rising foam of said liquid through said opening.

2. A device for moistening each cotton-picking spindle of a vertical row of spindles, comprising in combination, a vertical row of containers for moistening liquid, a support for said containers positioning said containers one above the other and spaced to provide one container below each spindle, each container having an opening in the top thereof, a conduit connected to each of said containers for supplying moistening liquid to said containers, and a second conduit connected to each of said containers for supplying air under pressure to the liquid in each container to agitate said liquid and generate a rising foam of said liquid through said openings.

3. A device for moistening each cotton-picking spindle of a vertical row of spindles, comprising in combination, a vertical row of containers for moistening liquid, a support for said containers positioning said containers one above the other in spaced relation to provide one container below each spindle, said support being pivotally mounted for deflection of said row of containers away from said row of spindles, a conduit connected to each of said containers for supplying moistening liquid to said containers, and a second conduit connected to each of said containers for supplying air under pressure to the liquid in each container to agitate said liquid and generate a rising foam of said liquid through said container openings.

4. A device for moistening a rotary cotton-picking spindle, comprising in combination, a circular container for moistening liquid, a support for said container positioning said container below said spindle, said container having an opening in the top thereof, a conduit connected to said container for supplying moistening liquid to said container, and a second conduit tangentially connected to said container for supplying air under pressure to the liquid in said container to agitate said liquid and generate a rising foam of said liquid through said opening.

5. A device for moistening each cotton-picking spindle of a vertical row of spindles, comprising in combination, a vertical row of containers for moistening liquid, a support for said containers positioning said containers one above the other and spaced to provide one container below each spindle, each container having an opening in the top thereof, the bottom of each container being of substantially conical shape with the apex extending downward, a conduit connected to each of said containers for supplying moistening liquid to said containers, and a second conduit connected to each of said containers for supplying air under pressure to the liquid in each container to agitate said liquid and generate a rising foam of said liquid through said opening.

6. A device for moistening each cotton-picking spindle of a vertical row of spindles as defined in claim 5 and including a metering head carried by said support for feeding equal amounts of moistening to each of said containers.

WILLIAM B. SMITH.

REFERENCES CITED

The following references are of record in the file of this patent:

UNITED STATES PATENTS

| Number | Name | Date |
|---|---|---|
| 1,708,179 | Hurt | Apr. 9, 1929 |
| 1,946,741 | Hamme | Feb. 13, 1934 |
| 1,978,721 | Perkins | Oct. 30, 1934 |
| 2,140,631 | Johnston | Dec. 20, 1938 |
| 2,213,122 | Gohre | Aug. 27, 1940 |
| 2,369,708 | Baker et al. | Feb. 20, 1945 |
| 2,433,083 | Baker et al. | Dec. 23, 1947 |